United States Patent [19]

Ross

[11] Patent Number: 4,522,490

[45] Date of Patent: Jun. 11, 1985

[54] METHOD AND APPARATUS FOR ADAPTING PHOTOGRAPHIC ENLARGERS FOR USE WITH LARGE FORMAT NEGATIVES

[76] Inventor: Alan B. Ross, 206 Caledonia St., #17, Sausalito, Calif. 94965

[21] Appl. No.: 552,483

[22] Filed: Nov. 16, 1983

[51] Int. Cl.³ .............................................. G03B 27/58
[52] U.S. Cl. ......................................... 355/75; 355/77
[58] Field of Search ...................... 355/75, 67, 18, 62, 355/63, 55, 52, 77

[56] References Cited

U.S. PATENT DOCUMENTS 3,486,807 12/1969 Pignone ................................. 355/62

Primary Examiner—L. T. Hix
Assistant Examiner—Brian W. Brown
Attorney, Agent, or Firm—John A. Bucher

[57] ABSTRACT

A method and apparatus for adapting photographic enlargers for use with various large format negatives are disclosed wherein a first large format negative stage is movably mounted relative to a lens stage of the enlarger for supporting a negative with its image focused upon suitable photographic paper or the like. A second large format negative stage is also placed at a selected spacing from the first large format negative stage by means of a suitable spacer to facilitate use of larger negatives, the spacer preferably being removable for permitting a single light source to be arranged closely adjacent to the second large format negative stage with the spacer in place and closely adjacent to the first large format negative stage with the spacer removed in order to achieve even, fully covered and optimum illumination.

16 Claims, 7 Drawing Figures

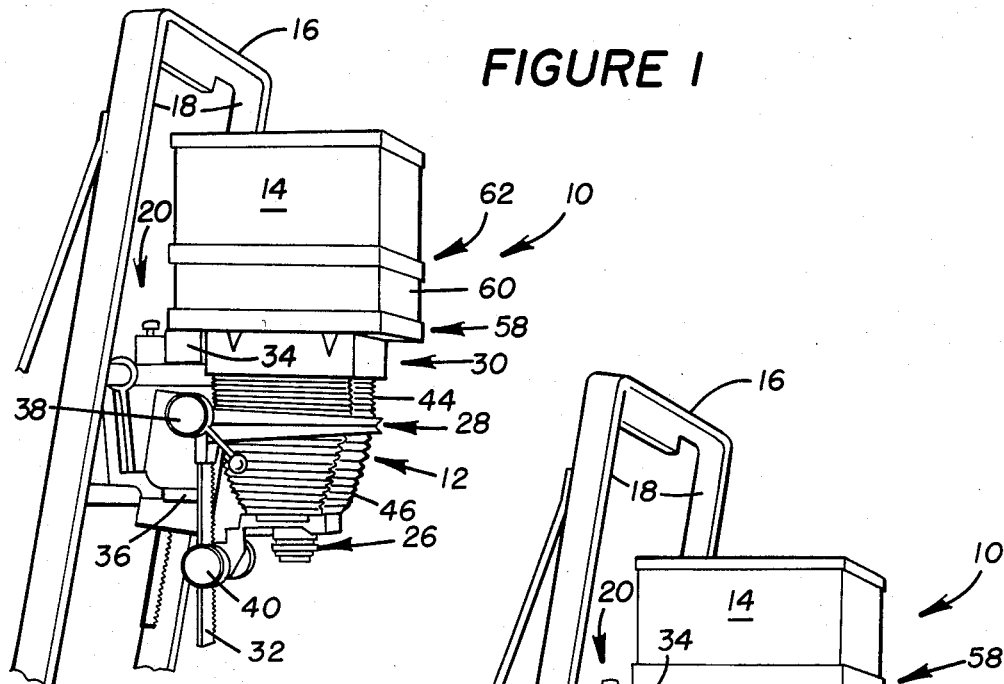
FIGURE 1
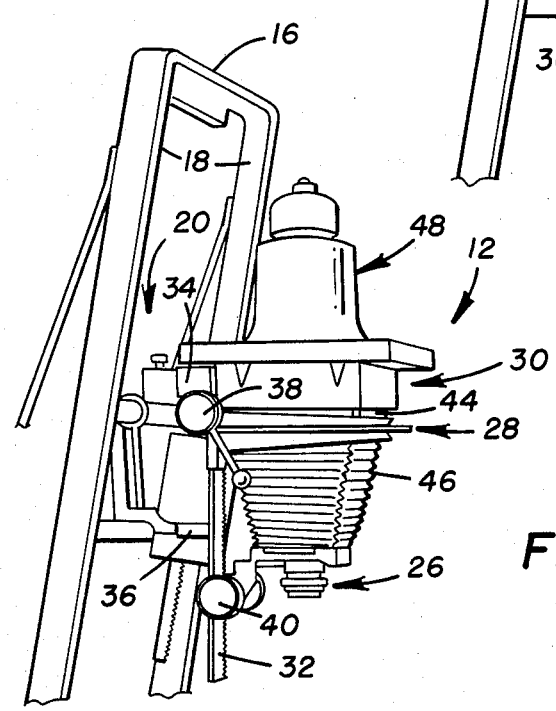
FIGURE 2
FIGURE 3

METHOD AND APPARATUS FOR ADAPTING PHOTOGRAPHIC ENLARGERS FOR USE WITH LARGE FORMAT NEGATIVES

BACKGROUND OF THE INVENTION

The present invention is directed toward a method and apparatus for adapting enlargers for use with large format negatives and more particularly to such a method and apparatus which can be employed with enlargers designed and built primarily for use with small format negatives.

Generally, commercially available enlargers which are portable or adapted for bench top operation are limited to use with small format negatives. Thus, amateur photographers or commercial photographers having limited darkroom space are precluded from enlarging large format negatives.

For purposes of the present invention, the term "large format" is intended to apply to negatives which are four inches by five inches and larger. Small format negatives are primarily contemplated as including 35 mm negatives, $2\frac{1}{4}$ inch negatives and four inch by five inch negatives at least under selected conditions. As for larger negatives included in the term "large format", eight inch by ten inch negatives and even negatives of larger size cannot be handled by presently available small format enlargers.

Many photographers using darkrooms of limited space (of the type referred to above) would prefer to be able to work with eight inch by ten inch or other large format negatives. A major advantage of course is that the large format negative has greatly increased surface area which permits much more subtle and detailed reproduction during enlargement. Although greater detail is possible with these large format negatives, commercially available large format enlargers are generally very expensive and require extensive amounts of space. For example, an enlarger capable of handling eight by ten inch negatives may cost as much as five to twenty times or more than commercially available bench top enlargers. In addition, existing large format enlargers may be as much as ten feet tall and weigh as much as 1,000 pounds. Accordingly, it is unrealistic for users of relatively small darkrooms to consider acquisition and use of these commercially available large format enlargers.

By way of example but without limiting the scope of the present invention in ay way, a typical small format enlarger of the type contemplated by the present invention is a Beseler enlarger (Model No. 45MX). The method and apparatus of the present invention is described below with particular exemplary reference to such an enlarger. The Beseler enlarger is described below only briefly in order to permit a complete understanding of the present invention. However, a greater understanding of the Beseler enlarger may be obtained for example by reference to U.S. Pat. No. 3,486,807 issued Dec. 30, 1969 under assignment to Charles Beseler Company. That patent relates to an enlarger (Beseler model CB7) which is of similar construction and operation as the above-noted Beseler model, at least for purposes of the present invention.

It is again emphasized that the method and apparatus of the present invention may similarly be employed with many existing small format enlargers (or even within an original enlarger design).

In any event, there has been found to remain a need for a method and apparatus for adapting such small format enlargers for use with large format negatives.

SUMMARY OF THE INVENTION

It is therefor an object of the invention to provide a method and apparatus for adapting small format enlargers for use with large format negatives.

It is more particularly an object of the invention to provide such an adaptive method and apparatus wherein an additional negative stage is provided on a small format enlarger but at greater distance from its lens stage so that the entire area of a large format negative mounted in the additional negative stage is within a light cone established by the lens stage. It is of course to be understood that the lens stage must necessarily be equipped with a lens suitable for use with a large format negative. Accordingly, it is preferably contemplated by the present invention that the small format enlarger be equipped with or be modified to include a lens stage permitting interchangeability of lenses.

It is an even further object of the invention to provide such a method and apparatus wherein multiple negative stages are provided in the enlarger. In this respect, the multiple negative stages are spaced apart from each other (and from the lens stage) in a predetermined manner so that a different negative size placed on either of the negative stages can be brought into focus with a suitable lens installed in the lens stage.

It is a still further object of the invention to provide an adapter for or modification of existing enlargers wherein the adapter itself includes multiple negative stages spaced apart a predetermined distance for accepting different sizes and preferably different standard sizes of large format negatives. It is a related object of the invention to provide such an adapter wherein a single light source may be employed in conjunction with each of the multiple negative stages. Accordingly, the method and apparatus of the invention particularly contemplates a removable spacer within the adapter, and a negative stage formed on either end of the spacer.

Even more preferably, the invention contemplates that the negative stage of the adapter be capable of using a common light source so that the light source may be closely adjacent to a negative mounted in either of its negative stages. Thus, with the spacer in place, the light source may be mounted on or adjacent to the negative stage which is more remote from the lens. The more remote negative stage is of course adapted for use with a large format negative of greater surface area. With the spacer being removed, the common light source may be mounted on or adjacent to the negative stage closer to the lens stage in order to achieve optimum illumination at that stage.

It is thus apparent that a particular advantage of the present invention is achieved by simply inserting or removing the spacer so that a negative stage is appropriately placed for handling any of a variety of large format negatives.

It is also to be understood that the concept of multiple negative stages is not limited to the large format scale referred to above. For example, the method and apparatus of the present invention similarly contemplates such an enlarger adaptation where, for example, one negative stage could be for large format negatives with the other negative stage being adapted for small format negatives.

Furthermore, it is also a particular object of the invention to provide a method and apparatus for adapting existing small format enlargers to provide two separate large format negative stages in addition to the original negative stage of the (unadapted) enlarger. Here again, any one of the multiple negative stages may be used as appropriate depending upon the size of the negative with respect to the type of enlarger which is to be used.

The invention further provides for positioning of the common light source in order to achieve optimum and even illumination for any of the multiple negative stages.

In this context, as noted above, light sources commonly employed with small format enlargers of the type referred to above sometimes only marginally illuminate the full surface area of four by five inch negatives. Accordingly, the present invention provides an adaptive method and apparatus including a light source suitable for uniformly illuminating all large format negatives with which the adapted enlarger can be employed.

It will also be noted in the following description that the Beseler models referred to above are equipped with light sources of different capabilities than that preferably contemplated by the present invention. Accordingly, it is further contemplated by the invention that the adapter permits either the use of the adapter's light source or the original light source in order to achieve even greater versatility.

Other objects and advantages of the present invention will be made apparent in the following description having reference to the accompanying drawings.

BRIEF DESCRIPTION OF THE DRAWINGS

FIG. 1 illustrates an existing enlarger and the adapter of the present invention.

FIG. 2 is a similar view of the existing enlarger and large format adapter but with a spacer element removed from the adapter for positioning a common light source more closely adjacent to a lower negative stage in the adapter assembly.

FIG. 3 illustrates the original enlarger including but not using the large format adapter assembly of the present invention in order to demonstrate that the existing enlarger may readily be reconverted to its original operating condition if desired, for example, for use with small format negatives in the original negative stage of the enlarger while using the original light source of the enlarger.

DESCRIPTION OF THE PREFERRED EMBODIMENT

Figure 5:
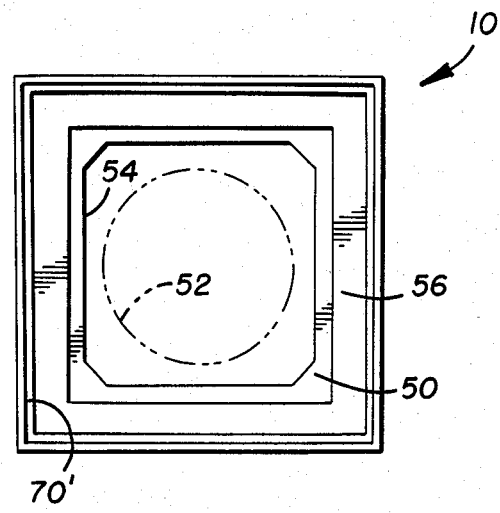
FIG. 5 is a plan view of the adapter assembly.

As noted above, the present invention is directed toward a method and apparatus for adapting small format enlargers for use with large format negatives. To illustrate the invention, a large format adapter assembly is generally indicated at 10 in FIGS. 1 and 2 together with portions of an existing small format enlarger generally indicated at 12.

The original construction of the existing enlarger with which the large format adapter assembly of the present invention is used may be best seen in FIG. 3. As will be made more apparent in the following description, the present invention permits a portable or bench type enlarger of the type generally indicated at 12 to be adapted for use with large format negatives by means of the large format adapter assembly 10. The combination of the original enlarger 12 and the large format adapter assembly 10 is dramatically different from large format enlargers commercially available in the past. For example, the enlarger 12 even with the large format adapter assembly 10 in place may readily be carried by one person, may be placed on a table top and may be moved from room to room if necessary. Of greater importance, the parts necessary for modifying such a portable small format enlarger for use with large format negatives are relatively inexpensive and may be installed in a very short time.

The method and apparatus of the present invention provides a further advantage in that the large format adapter assembly is contemplated to include a light source particularly adapted for providing very even or uniform illumination for large format negatives of greatest area with which the adapted enlarger may be used. For purposes of the present invention, it is particularly contemplated that the adapter assembly equip the enlarger so that it may readily be usable with large format negatives including eight by ten and four by five negatives. Accordingly, a light source 14 forming a portion of the large format adapter assembly 10 is of a square or rectangular configuration sufficiently large to overlap the largest area negative so that uniform illumination is provided even at the corners of the negative. The light source indicated at 14 in the drawings is of a approximately twelve inch square configuration since it is commercially available under the trade name ARISTO 1212 which is commercially available from Aristo Grid Lamp Products, Inc. It will also be noted that the use of this "oversize" light source may require the use of spacer blocks, as shown for example in the Beseler enlarger in order to prevent interference between the light source and the frame of the enlarger. However, a smaller light source could be used which would still overlap even an 8 by 10 negative while avoiding the possibility of interference with the frame even without use of the spacer blocks described below.

In any event, either the light source 14 or a smaller overlapping light source as described above would also assure overlapping engagement and thus uniform illumination of all sizes of large format negatives or even small format negatives if desired.

Before proceeding further with a description of the large format adapter assembly 10 of the present invention, the construction and operation of the existing enlarger 12 is set forth below to the extent necessary for a complete understanding of the invention.

Referring particularly to FIG. 3 which illustrates the existing enlarger by itself, the enlarger includes a generally vertical U-shaped frame formed with elongated side rails 18 for supporting a moveable carriage 20. A baseplate 22 is formed at the bottom of the U-shaped frame 16 for conventionally mounting photographic paper or the like to be treated with the enlarger. Since the baseplate 22 is of very conventional construction, it is not illustrated in FIGS. 1-3 but is indicated in the schematic representation of FIG. 7. In any event, the baseplate 22 is adapted for mounting photographic paper or the like (not shown) in position along an optical axis 24 of the enlarger.

Referring again particularly to FIG. 3, a lens stage 26, a small format negative stage 28 and a condenser or light source stage 30 are supported upon the carriage 20 so that they may be moved up and down on the frame 16 in unison for varying the size of an image projected onto the photographic paper on the baseplate 22. In this regard, the large format adapter assembly described below permits such a portable enlarger to be capable of much more versatile operation. For example, with the large format adapter assembly of the present invention, the enlarger 12 is capable of either reducing an 8 by 10 negative to about a 6 by 8 image or to enlarge the 8 by 10 negative to form an image as large as 24 by 30 inches on the baseplate 22 with a single lens of appropriate focal length. This range of operation is not set forth as a limitation for the invention but is only provided to demonstrate versatility achieved by the large format adapter assembly 10.

Referring again to the existing enlarger 12 with particular reference to FIG. 3, the carriage 20 includes a vertical rack or vertical element 32 to which the various stages are connected. In order to provide operating freedom with the oversized light source 14 as described above, spacer blocks 34 and 36 are inserted behind the rack or vertical element 32 in order to shift it forwardly and away from the frame 16. However, with a smaller overlapping light source as discussed above or with an enlarger of different basic design such as the OMEGA D5500 marketed by BERKEY MARKETING COMPANIES, it would of course not be necessary to employ the spacer blocks 34 and 36.

The condenser stage 30 is mounted in fixed relation upon the vertical element 32 while the lens stage 26 and negative stage 28 are movable on the rack 32 by control knobs 40 and 38 respectively. Thus, the negative stage 28 and lens stage 26 are movable both relative to each other and relative to the condenser stage 30 in order to assure that they are in proper focus. The lens stage 26 is of a type permitting interchangeability of its lens 42 (see FIG. 7). In addition, upper and lower bellows 44 and 46 extend from the fixed condenser stage 30 toward the lens stage 26 and negative stage 28. The condenser stage 30 is a relatively simple bracket for mounting a light source 48 which is of a type particularly contemplated for movement relative to the negative stage in order to assure proper focus of the light source upon the negative (not shown) in the small format negative stage. The upper bellows 44 accommodates the relative movement necessary for this purpose between the condenser stage and the negative stage. The lower bellows 46 of course similarly accommodates movement between the lens stage 26 and negative stage 28 in order to achieve necessary focusing between those components.

Before leaving the construction of the existing enlarger as shown in FIG. 3, it is also noted that the original light source 48 for the existing enlarger is generally round and is supported by a plate 50 in the condenser stage which is indicated at 50 in FIG. 5. Within the original design of the enlarger, the support plate 50 is formed with a central opening illustrated in broken lines at 52 in FIG. 5 to accommodate the light source 48 supported on the condenser stage. However, in order to adapt the enlarger for use with large format negatives as contemplated by the present invention, it is necessary to either substitute the plate 50 with a similar plate having an appropriate opening or enlarge the opening 52 so that the entire area of large format negatives can be in proper communication with the lens 42. For this reason, the original support plate 50 of the condenser stage 30 is illustrated in FIG. 5 but with an enlarged opening 54.

With this background description of the existing enlarger 12, the construction and operation of the adapter assembly 10 is described below with reference to FIGS. 1 and 2 as well as FIGS. 4-7.

The large format adapter assembly 10 basically includes a lower support structure 56 adapted for mounting on the condenser stage 30 of the existing enlarger, a first large format negative stage 58 formed on the support structure 56, a spacer element 60, a second large format negative stage 62 carried on the spacer element 60 and the overlapping source 14 referred to above. Generally, the purpose of these elements is to permit placing of different size, large format negatives in either the first or second negative stages 58 and 62. Nominal spacing provided between the lens 42 and the first large format negative stage preferably adapts the first negative stage 58 for positioning a standard large format negative in focus with a suitable lens as indicated at 42 in FIG. 7. The vertical dimension of the spacer element 60 is selected so that the second large format negative stage 62 is positioned upwardly from the first negative stage 58 by a predetermined distance so that another larger area negative placed in the second large format negative stage 62 would also be in focus with a suitable lens as indicated at 42 in FIG. 7.

The spacer element 60 is preferably removable so that the light source 14 may be placed closely adjacent to either the second large format negative stage 62 or the first large format negative stage 58. Construction of the adapter assembly 10 is particularly contemplated to facilitate this mode of operation. However, before describing the construction features of the adapter assembly 10, it is noted that the existing (or unadapted) enlarger 12 in the configuration illustrated in FIG. 3 is considered suitable for use with four inch by five inch negatives. However, four by five inch negatives are included in the large format size of the present invention for the following reason: Even if a four by five negative were placed in the negative stage 28, light from some diffusion light sources mounted in the original opening 52 (see FIG. 5) would not provide uniform illumination particularly at the corners of the four by five inch negative.

Accordingly, it has been found that the first large format negative stage 58 of the adapter assembly 10 is much better suited for use with such large format four by five negatives. The second large format negative stage 62 is preferably positioned for use with a standard eight by ten negative. However, it is again noted that these negative sizes are set forth only by way of example. Other large format negative sizes could of course also be used in conjunction with the adapter assembly 10. In fact, it would also be possible to further modify the adapter assembly 10 so that it would provide even more negative stages besides the first and second stages indicated at 58 and 62. Those additional stages (not shown) could be positioned for accepting other standard large format negative sizes.

Figure 4:
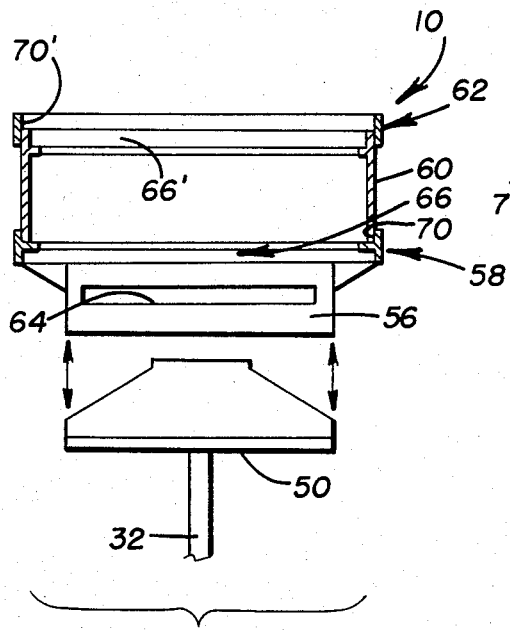
FIG. 4 is a front view in elevation of the adapter assembly of the present invention.
Figure 6:
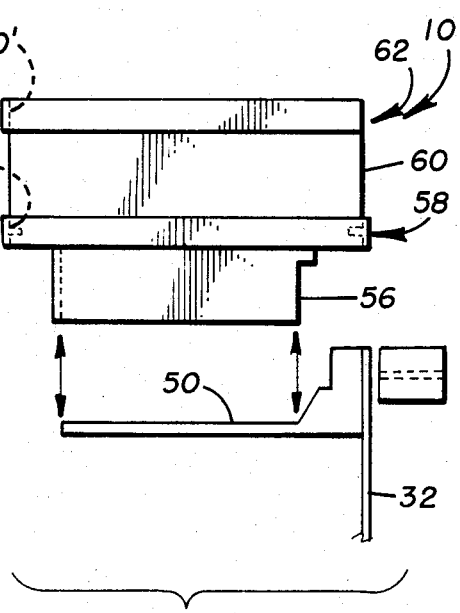
FIG. 6 is a view taken from the right side of FIG. 4.

Referring now particularly to FIGS. 4-6, the support structure 56 is merely a fabricated assembly which functions in the existing enlarger 12 (see FIG. 3) to enclose lower projecting portions of the original light source 48. Note that the support structure 56 includes a slot 64 which may be used for inserting condenser filters (not shown) for use in conjunction with the original light source 48. The first large format negative stage 58 is formed as a conventional bracket with an opening 66 into which a negative such as a large format four by five in a suitable carrier (not shown) may be inserted.

The first large format negative stage 58 is formed with an upstanding bracket 70 while the spacer element 60 is of a rectangular configuration to fit within the bracket 70.

As noted above, the second large format negative stage 62 is of similar construction as the first large format negative stage 58. However, the second large format negative stage 62 is preferably mounted upon the spacer element 60 so that it may be removed from the adapter assembly together with the spacer element.

Figure 7:
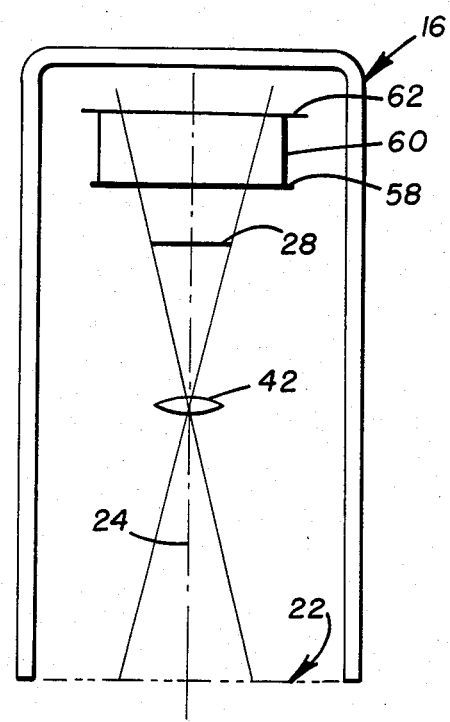
FIG. 7 is a schematic representation of a small format enlarger such as that illustrated in FIGS. 1-3 together with the large format adapter assembly of the present invention in order to better illustrate the purpose of multiple negative stages provided by the adapter assembly.

In any event, it may be seen that the adapter assembly 10 of the present invention modifies the existing enlarger 12 to permit much more versatile use in enlarging large format negatives as well as small format negatives. This greater versatility is best illustrated in FIG. 7 which shows the lens 42 above the baseplate 22 upon which suitable photographic material (not shown) or the like would placed. Either with the adapter assembly 10 in place upon the existing enlarger or with the adapter assembly 10 removed from the enlarger, the enlarger would be available for conventional operation with a small format negative (not shown) positioned in the small format negative stage 28. With the adapter assembly 10 in place, a large format negative (not shown) could be placed in either the first or second large format negative stages 58 and 62.

With the first or lower large format negative stage being used to mount a negative, the spacer element 60 could either remain in place with the light source spaced above the negative stage or the spacer element and second large format negative stage 62 could be removed in order to permit the light source to be mounted directly adjacent the first large format negative stage 58. In this regard, note that a similar bracket 70' is formed above the second large format negative stage for receiving the light source 14. With the spacer element 60 and second large format negative stage removed, the light source 14 would thus similarly nest in the bracket 70 of the first negative stage 58.

Finally, it is immediately apparent that the lens 42 must be of an appropriate focal length for use with negatives in each of the respective negative stages 28, 58 and 62. This is permitted by replacement of the lens 42 as necessary within the lens stage 26. Selection of an appropriate lens is believed obvious. However, it is noted that a conventional enlarging lens having a focal length of 150 millimeters may be used for example with four by five inch negatives in the first negative stage 58. Such a lens however would not project a sufficiently large light cone to encompass an eight by ten negative located in the second large format negative stage 62. Accordingly, it is contemplated that with an eight by ten negative in the second stage 62, the lens 42 could for example be a 210 millimeter lens which, as noted above, would permit the eight by ten negative to be reduced to a six by eight print on the baseplate 22 or enlarged to as much as a 24 by 30 inch print. Here again, it is noted that this range is set forth only to demonstrate versatility of the adapter assembly and not to limit the scope of the invention.

Various modifications and additions are believed obvious from the preceding description. In particular, it will be obvious that the adapter assembly 10 could be used in conjunction either with existing enlargers or could be part of newly designed and manufactured enlarger including the adapter assembly as an integral part thereof. Other modifications are also obvious. For example, instead of the spacer element 60 being removable to permit mounting of the light source 14 closely adjacent to the lower negative stage 58, the lower negative stage 58 could be omitted from the design. Then, instead of removing the spacer element 60, it would merely be reversed so that the upper negative stage 62 would be in the same position as the lower negative stage illustrated at 58. Further modification of the support structure 56 and light source 14 would permit the light source 14 to remain closely adjacent the negative stage in either position. Additional modifications are believed to be clearly apparent from the preceding description. Accordingly, the scope of the invention is defined only by the following appended claims.

What is claimed is:

1. An adapter assembly for use with enlargers of a type including a longitudinal frame means carrying relatively movable lens, negative and condenser stages arranged along an optical axis for focusing images of smaller format negatives upon photographic paper or the like, the lens stage being adapted for use with various lenses, the adapter permitting use of large format negatives with the original lens stage for similarly focusing images of large format negatives upon the photographic material or the like and comprising a first large format negative stage mounted on the condenser stage at a sufficient distance from the lens stage so that a larger format negative arranged in the large format negative stage is within a light cone established by the lens, a light source suitable for illuminating the large format negative being mounted on the first large format negative stage opposite the lens stage.

2. The adapter of claim 1 further comprising a second large format negative stage arranged in spaced apart relation to said first large format negative stage and means for mounting the light source for illumination of both said first and second negative stages.

3. The adapter of claim 2 wherein said second large format negative stage is carried by spacer means supported adjacent to said first large format negative stage, said first and second large format negative stages each being adapted for mounting said light source closely adjacent thereto for optimum illumination, said spacer and said second large format negative stage being removable to permit positioning of said light source closely adjacent said first large format negative stage.

4. The adapter of claim 3 wherein said first large format negative stage is spaced apart from said lens stage at a selected distance for placing a standard large format negative generally in focus through said lens stage on said photographic material, the spacer means providing selected spacing between said first and second large format negative stages for permitting a second standard large format negative arranged on said second large format negative stage to be generally in focus through said lens stage with the photographic material.

5. The adapter of claim 4 wherein positioning of said first large format negative stage is selected for use with four inch by five inch negatives, positioning of said second large format negative stage being selected for use with eight inch by ten inch negatives.

6. The adapter of claim 2, wherein said first large format negative stage is spaced apart from said lens stage at a selected distance for placing a standard large format negative generally in focus through said lens stage on said photographic material, the spacer means providing selected spacing between said first and second large format negative stages for permitting a second standard large format negative arranged on said second large format negative stage to be generally in focus through said lens stage with the photographic material.

7. The adapter of claim 6 wherein positioning of said first large format negative stage is selected for use with four inch by five inch negatives, positioning of said second large format negative stage being selected for use with eight inch by ten inch negatives.

8. The adapter of claim 7 wherein said light source is selected for providing uniform illumination over a rectangular area of at least eight inches by ten inches.

9. The adapter of claim 2 wherein said light source is selected for providing uniform illumination over an area at least equal to a large format negative supported in said second large format negative stage.

10. In a method for use with enlargers of a type including a longitudinal frame means carrying relatively movable lens, negative and condenser stages arranged along an optical axis for focusing images from small format negatives upon photographic paper or the like, the lens stage being adapted for use with interchangeable lenses, the method permitting use of large format negatives with the original lens stage for focusing images of a large format negative upon the photographic paper, the method comprising the steps of forming a large format negative stage on the condenser stage at a sufficient distance from the lens so that a large format negative arranged in the large format negative stage is within a light cone for the lens, selecting a light source suitable for illuminating the large format negative and mounting the selected light source on the large format negative stage opposite the lens stage.

11. The method of claim 10 further comprising the step of alternating said large format negative stage between first and second locations suitable for use with separate standard large format negatives in order to respectively place them generally in focus through the lens stage with the photographic paper.

12. The method of claim 11 further comprising the step of mounting the light source for illumination of a negative carried in either of said first and second negative stages.

13. The method of claim 12 further comprising the step of selecting spacer means for establishing predetermined spacing between said first and second large format negative stages.

14. The method of claim 13 wherein the location of said first large format negative stage relative to the lens stage is selected for use with four inch by five inch negatives while the spacer means is selected for establishing the second large format negative stage for use with eight inch by ten inch negatives.

15. An adapter assembly for use in small format enlargers of a type including an elongated frame means carrying a movable lens stage arranged along an optical axis for focusing images from small format negatives upon photographic paper or the like, the lens stage being adapted for use with interchangeable lenses, the adapter comprising a first negative stage, means for mounting said first large format negative stage on the elongated frame and along the optical axis at a distance from the lens stage for placing a large format negative carried by said first large format negative stage in focus through said lens stage with the photographic material, a spacer means adapted for establishing a second large format negative stage spaced apart from said first large format negative stage at a distance from said lens stage for placing a second size large format negative generally in focus with said photographic paper and a light source suitable for mounting adjacent either the first or second negative stage, said spacer means being adapted to permit placement of the light source in illuminating relation with a negative on either said first or second large format negative stage.

16. The adapter assembly of claim 15 wherein said spacer means is a removable element adapted for mounting on said first large format negative stage, said second large format negative stage carried by said spacer element, said light source adapted for mounting closely adjacent either of said first and second large format negative stages for providing maximum illumination.

* * * * *